(12) United States Patent
Montcalm

(10) Patent No.: US 11,063,880 B2
(45) Date of Patent: Jul. 13, 2021

(54) SYSTEM AND METHOD FOR QUEUE LOAD BALANCING

(71) Applicant: Mitel Networks Corporation, Ottawa (CA)

(72) Inventor: Michael Montcalm, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 144 days.

(21) Appl. No.: 16/402,751

(22) Filed: May 3, 2019

(65) Prior Publication Data

US 2019/0342226 A1 Nov. 7, 2019

(30) Foreign Application Priority Data

May 4, 2018 (EP) ..................................... 18170919

(51) Int. Cl.
| | |
|---|---|
| *H04L 12/863* | (2013.01) |
| *H04L 12/873* | (2013.01) |
| *H04L 12/875* | (2013.01) |
| *H04L 29/06* | (2006.01) |

(52) U.S. Cl.
CPC ........ *H04L 47/6255* (2013.01); *H04L 47/521* (2013.01); *H04L 47/56* (2013.01); *H04L 65/80* (2013.01)

(58) Field of Classification Search
CPC ... H04L 47/56; H04L 47/521; H04L 47/6255; H04L 65/80
See application file for complete search history.

(56) References Cited

U.S. PATENT DOCUMENTS

| | | | |
|---|---|---|---|
| 8,422,644 B2 | 4/2013 | Fan et al. | |
| 10,348,904 B1* | 7/2019 | Howard | .............. H04L 65/1069 |
| 2011/0307547 A1* | 12/2011 | Backer | ............... G06Q 10/1095 |
| | | | 709/203 |
| 2015/0249692 A1* | 9/2015 | Sankaranarayanan | ....................... |
| | | | H04L 65/4015 |
| | | | 705/7.15 |
| 2015/0312416 A1 | 10/2015 | Cahill et al. | |
| 2016/0344869 A1 | 11/2016 | Patel et al. | |
| 2017/0054849 A1 | 2/2017 | Torre et al. | |
| 2018/0084111 A1* | 3/2018 | Pirat | ....................... H04L 51/04 |

* cited by examiner

*Primary Examiner* — Jamal Javaid
*Assistant Examiner* — Ryan C Kavleski

(57) ABSTRACT

A communications system is configured to facilitate communication via a plurality of communication types and comprises at least one queue monitor. The system is configured to determine a number of users on hold in a queue for each of the communication types, to compare the determined number of users on hold to a configurable threshold value for each communication type and, when the number of users on hold in a queue for a first communication type exceeds a threshold value for the first communication type, to send a notification to one or more of the users on hold in that queue, the notification comprising an option to switch to an alternative communication type.

18 Claims, 6 Drawing Sheets

SYSTEM AND METHOD FOR QUEUE LOAD BALANCING

CROSS REFERENCE TO RELATED APPLICATIONS

This application claims the benefit and priority of European Patent Application No. EP 18170919.7 filed on May 4, 2018, the contents of which are hereby incorporated herein by reference.

FIELD

The present invention relates to a communications server configured to facilitate communication via a plurality of communication types, to monitor the number of users on hold in a queue for each communication type and to offer users waiting in a queue the option to use an alternative communication type.

BACKGROUND

At present, a customer communicating with a remote support centre and waiting for a customer agent to become available, has only the option to be placed into a waiting list for the communication channel via which they have contacted the support centre. This may cause significant backlog in the most frequently used communication channels. Each customer on hold in a queue uses up the available bandwidth capacity of the system as well as processing resources at a server managing the connections. The longer customers are on hold in a queue, the less efficient the system becomes in terms of bandwidth and computational resources.

SUMMARY

A first aspect of the invention provides a communications system configured to facilitate communication via a plurality of communication types, the communications system comprising:
at least one queue monitor configured to determine a number of users on hold in a queue for each of the communication types,
wherein the communications system is configured:
to compare the determined number of users on hold in the queue for each of the communication types to a configurable threshold value for each of the communication types; and
when the number of users on hold in a queue for a first communication type exceeds a threshold value for the first communication type, to send a notification to one or more of the users on hold in the queue, the notification comprising an option to switch to an alternative communication type.

The communications system may be further configured to: receive a signal from a user terminal, the signal representing a user input selecting the alternative communication type; and in response to receiving the signal, disconnect the user terminal from the first communication type and to connect the user terminal via the alternative communication type.

The communications system may be further configured to: receive a signal from a user terminal, the signal representing a user input selecting the alternative communication type; and in response to receiving the signal, to connect the user terminal via the alternative communication type while maintaining the user's position in the queue for the first communication type.

The above recited features provide the advantage that user are on hold in queues for a reduced period of time. This in turn reduces the overall bandwidth usage of the system and the computational burden on the system.

The number of users on hold in the queue of the second communication type may be below the threshold value for the second communication type. The notification may comprise a plurality of options to switch to one of a plurality of alternative communication types. The notification may further comprise an estimated hold time for the alternative communication type. The threshold value may correspond to an average maximum holding time.

The plurality of communication types may include at least two of: voice call, online chat, video call, web conference, Short Message Service and email.

The communications system may be configured to facilitate communication between a plurality of agents and a plurality of users. The communications system may be configured to simultaneously: facilitate communication between a first agent and a first user via a first communication type; and facilitate communication between the first agent and a second user via a second communication type. The first communication type may be a voice call and the second communication type may be one of an online chat or SMS.

One or more of the communication types may comprise multiple queues and the queue monitor may be configured to average the number of users on hold in the multiple queues.

The communications system may be configured to, when the number of users on hold in a queue for a first communication type exceeds a threshold value for the first communication type, send the notification to a user having the highest position in the queue. The communications system may be further configured to, when the number of users on hold in a queue for a first communication type exceeds a threshold value for the first communication type, send the notification to all of the users on hold in the queue.

The communications system may be further configured to estimate a hold time remaining for each user on hold in a queue for a first communication type and to send the notification to the first user in the queue for the first communication type whose estimated hold time remaining exceeds a configurable threshold value. The communications system may be further configured to send the notification to all of the users in the queue for the first communication type whose estimated hold time remaining exceeds the configurable threshold value.

The communication system may be a communications server.

A second aspect of the invention provides a method for operating a communications system configured to facilitate communication via a plurality of communication types, the method comprising:
a queue monitor determining a number of users on hold in a queue for each of the communication types;
the communications system comparing the determined number of users on hold in the queue for each of the communication types to a configurable threshold value for each of the communication types;
when the number of users on hold in a queue for a first communication type exceeds a threshold value for the first communication type, the communications system sending a notification to one or more of the users on hold in the queue, the notification comprising an option to switch to an alternative communication type.

A third aspect of the invention provides a non-transitory computer-readable storage medium having stored thereon computer-readable code, which, when executed by computing apparatus, causes the computing apparatus to perform the method of the second aspect of the invention.

A fourth aspect of the invention provides a communications system configured to facilitate communication via a plurality of communication types, the communications system comprising:

at least one queue monitor configured to determine a number of users on hold in a queue for each of the communication types, wherein the communications system is configured:

to compare the determined number of users on hold in the queue for each of the communication types to a configurable threshold value for each of the communication types;

when the number of users on hold in a queue for a first communication type exceeds a threshold value for the first communication type, to initiate a communication with a known user on hold in the queue via an alternative communication type; and to maintain the known user's position in the queue for the first communication type while communicating via the alternative communication type.

BRIEF DESCRIPTION OF THE DRAWINGS

Embodiments will now be described, by way of example only, with reference to the accompanying drawings, in which.

DETAILED DESCRIPTION

Figure 1:
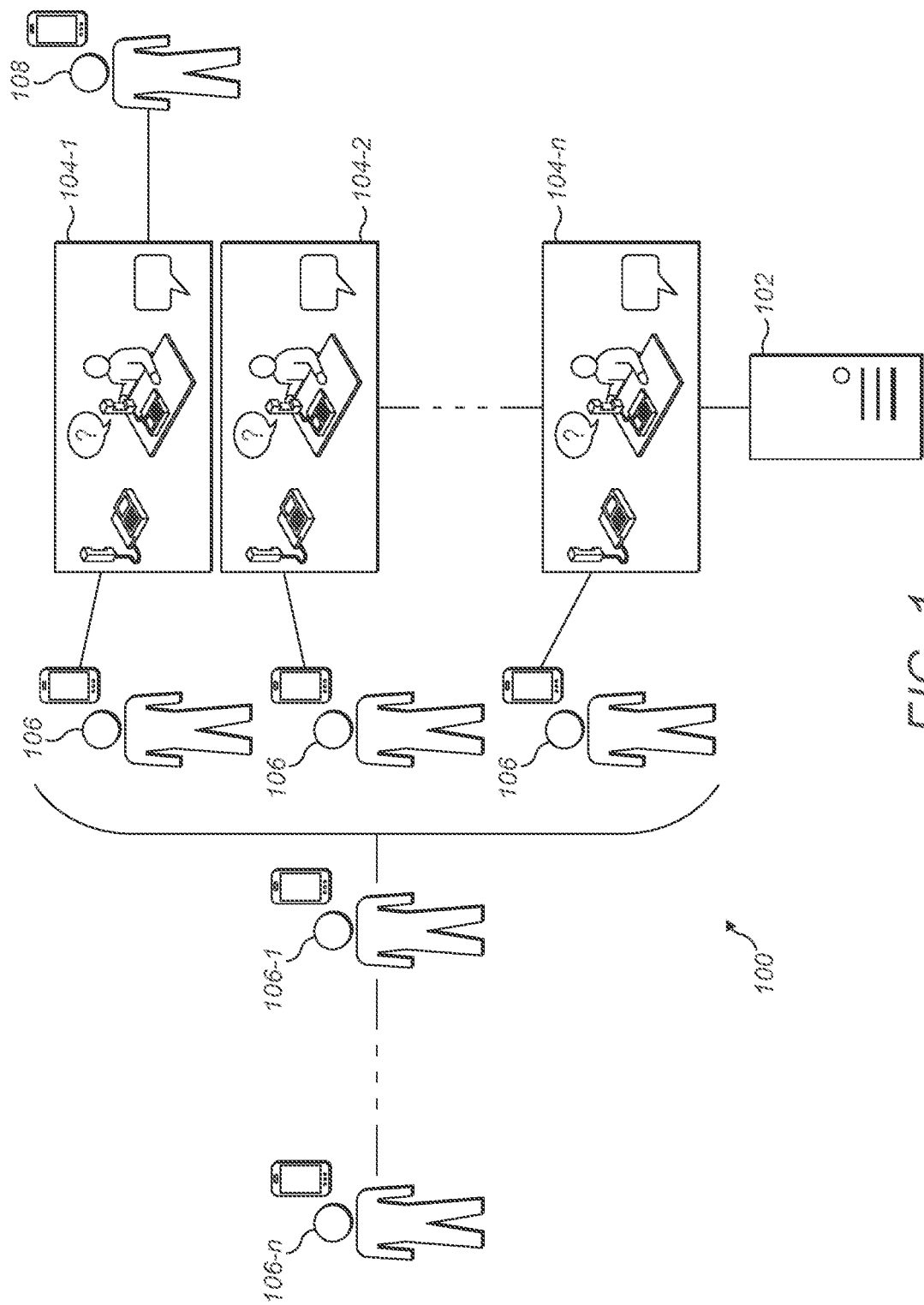
FIG. 1 shows a communications system for queue load monitoring and balancing in an initial state.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

FIG. 1 shows a communications system 100 for queue load monitoring and balancing. The communications system 100 comprises a communications server 102 and a plurality of agent terminals (104-1 to 104-n). Each agent terminal 104 may be comprised of a number of separate devices, such as a computer and VOIP phone. Each terminal 104 may also comprise, or be linked to, one or more mobile communication devices, such as a mobile phone. Each agent terminal 104 is in communication with the communications server 12 via one or more channels. An agent is associated with each agent terminal 104 and uses the terminal to communicate via a number of different communication mediums. For example, the terminals 104 may allow the agent to communicate via voice, video, Short Message Service (SMS), email, online chat and/or web conferencing.

The communication server 102 is configured to direct incoming communications from customers, hereafter referred to as users 106. FIG. 1 shows a situation in which all of the available agents 104-1 to 104-*n* are engaged on voice calls with users 106. A queue of users, including a first user 106-*i* and a last user 106-*n*, who are being held in a queue to speak to an agent, is also shown. The first agent 104-1 is also engaged in an SMS communication with a second user 108. In general each agent 104 may engage in multiple types of communication simultaneously. For example, each agent 104 may engage in a voice or video call and in addition one form of written communication, such as online chat or SMS. Alternatively, each agent 104 may simultaneously engage in two or more instances of written communication in addition to one video or voice call. As can be appreciate from FIG. 1, only the first agent 104-1 is engaged in both a voice call and written communication with users. The other agents 104 are therefore being underutilized.

The communications server 102 comprises at least one queue monitor (see FIG. 4), which monitors the number of users 104 on hold for each communication type. The communications server 102 is configured to use the information from the queue monitors to compare the number of users on hold in a queue to a configurable threshold value for that queue. The threshold value for each queue may be settable by the operator of the communications server 102. For example, the threshold value for a queue may be expressed as a maximum number of users on hold. Alternatively, the threshold value may be expressed as a percentage of the total number of agents able to communicate via the corresponding communication channel. In this manner, the threshold value represents a maximum overload factor for the respective communication type. As an example, if the total number of agents who are able to communicate via a voice call is 100, and the threshold value is expressed as 10%, then the threshold will be met when 10 users are on hold in the queue.

Figure 2:
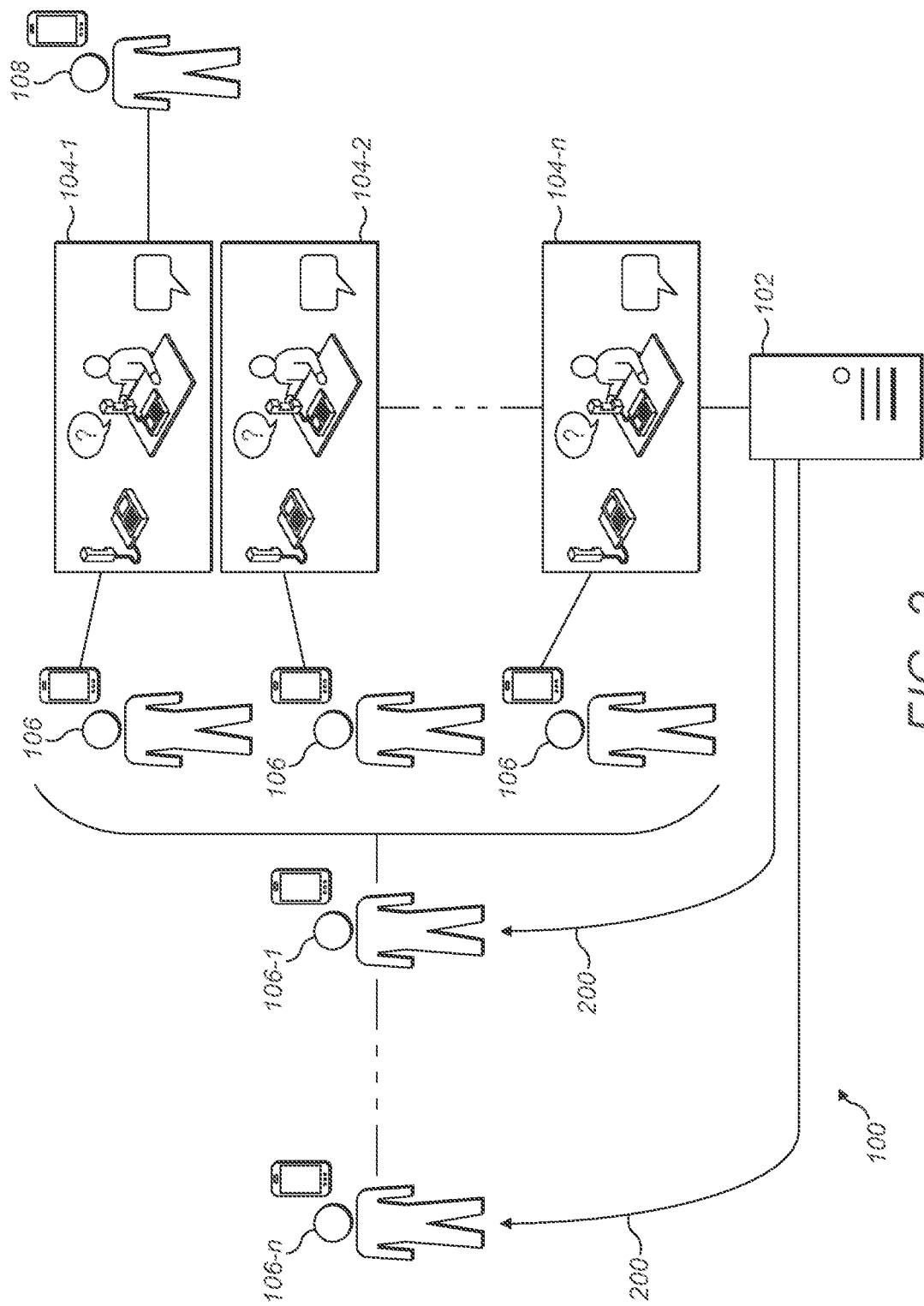
FIG. 2 shows the communications system of FIG. 1 and action taken by a communications server.

FIG. 2 illustrates a situation in which the number of users on hold in the voice communication queue has exceeded the threshold value. In this situation, the communications server 102 is configured to send a notification 200 to some or all of the users on hold in the queue. The notification 200 gives these users the option to switch to an alternative communication type. In the example shown in FIG. 2, the communications server 102 offers all of the users on hold in the voice call queue to the option to switch to SMS. The communications server 102 collates information from all of the queue monitors to determine which options to offer the users. For example, if there is also a queue of users on hold for SMS communication, then the communications server 102 will not offer users on hold in the voice call queue to option to switch to SMS communication. In general, the communications server 102 does not offer users the option to switch to a less preferred communication type, where that communication type also has a queue.

The communications server 102 may be configured to only offer the option to switch to SMS communication to those users who are using a communication device with the appropriate capabilities. For example, the communications server 102 may be configured to determine whether each user (106-1 to 106-*n*) in the voice call queue is using a mobile phone or a landline phone and to offer the option to switch to SMS communication only to those users using a mobile phone. Alternatively, the communications server 102 may offer the option to switch the SMS communication to all users, and for those users who are determined to be using a landline, provide further instructions for the entering of a mobile phone number via which the SMS communication can then be conducted.

As the users (106-1 to 106-*n*) in the voice call queue are listing to on-hold audio, the notification 200 may be provided via the on-hold audio. The notification may take the form of a push message. For example, the on-hold audio may be interrupted and a pre-recoded message played to the users offering the user the option to switch to SMS communication. The pre-recorded audio may instruct the users to select a number via their keypad, which will end the current call and initiate an SMS communication.

The user provides an input to their communication terminal to accept the switch to the alternative communication type. The user's communication terminal then sends a signal back to the communications server 102. This signal is received by the communications server 102, which causes the communications server 102 to implement the transfer of that user from their current communication type to the selected alternative communication type.

Figure 3:
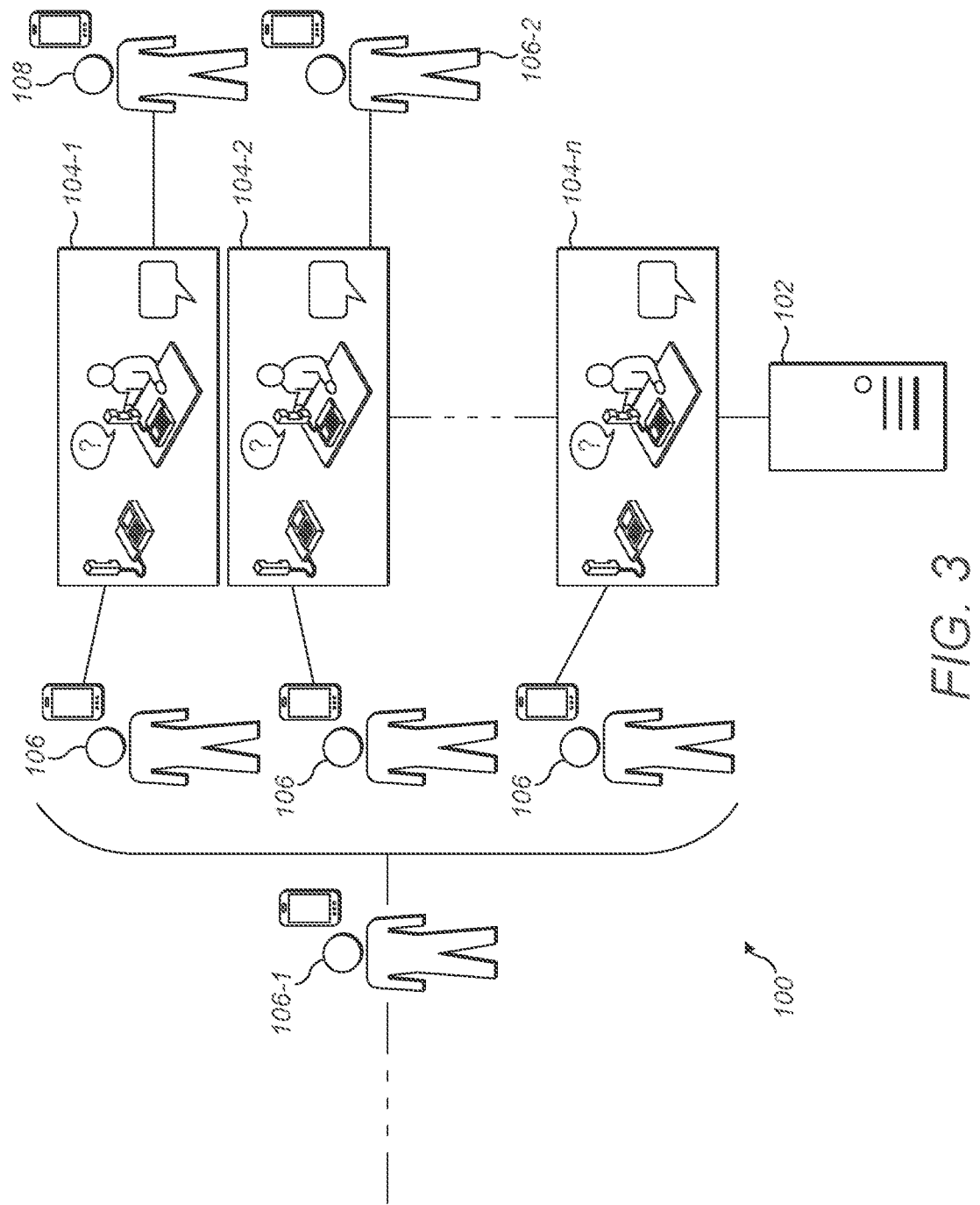
FIG. 3 shows the system of FIGS. 1 and 2 after a rebalancing of the queues for different communication types.

In FIG. 3, the second user 106-2 in the voice call queue has decided to accept the option to switch to SMS and is now in communication with the second agent 104-2, via SMS. The first user 106-1 in the voice call queue has decided to remain on hold for a voice call. When a user accepts the option to be transferred to an alternative communication type, the communications server 102 is configured to seamlessly transfer the user. The call or communication session is not considered to be abandoned or counted as two separate calls/session by the communications server 102.

As an example, if user 106-2 on hold in a voice call queue accepts an option to switch to SMS communication, the communications server 102 creates a new case ID and associates that user's information to the case ID. Alternatively, a case ID may be created during initial call setup. The server 102 then assigns this case ID to the SMS queue. The SMS queue monitor 212 or the processor 202 of the server 102 then selects an agent (in this case agent 104-2) and assigns the case to them. Therefore, when the agent 104-2 engages in an SMS communication with the user 106-2 who has been moved, they already have the relevant user information and the case ID is perpetuated, so that the switch between the communication types is not considered an abandonment of the original call.

A default greeting message may be sent by the server 102 to the user 106-2 using the number obtained from the user's CLI (if the user called on a mobile phone) or a number entered through a menu during switching (if the user called on a land line). The user 106-2 receives the initial greeting message from the server 102 while the server routes the SMS case to agent 104-2. The user can then reply to the welcome SMS with their issue statement. Agent 104-2 will then receive the SMS in the open case as a new message and can reply as they would have had the case originally come in via SMS. The case can also be updated with a note stating that the communication came in via voice and was moved to SMS, for the purpose of improved customer experience and metrics gathering.

Since several available agents 104 are not engaged in SMS communications, the newest made SMS case will be placed at the top of the SMS queue and assigned immediately to a free agent (as there is no queue). In some embodiments, if there is a queue of users waiting for SMS communication, the system 100 is configured not to offer the option of switching to SMS communication. Another communication type, with no queue, may be offered. In these embodiments, the offer to switch communication types is only made if there is capacity to begin instantly serving the user on that other communication type. In some other embodiments, the user may be offered a switch to an alternative communication type if it is determined that the queue time for that other communication type is less, or significantly less, than the user's current predicted queue time. If the user is going to be transferred from a queue for one communication type into a queue for an alternative communication type, then the server 102 may send the user a warning that they will still be held in a queue (but that the wait time is expected to be shorter) before the user accepts the transfer.

The above described embodiments (of FIGS. 1-3) have the advantage that the overall time in which users are held in queues is reduced. This has a benefit for the communications system and in particular the server 102 managing the individual connections. Each user being held in a queue represents a connection which must be maintained and which uses a portion of the available bandwidth of the system. For systems which handle a large volume of traffic and which may regularly have to manage large queues, the bandwidth requirements are high. This is particularly true for voice calls, which use a larger amount of bandwidth to maintain than other types of communication medium. Reducing, system wide, the overall time in which users are held in queues has a corresponding benefit in reducing the bandwidth usage of the system and the computational resources required at the server 102.

The server 102 may be configured to analyze how and when users are choosing to be moved to an alternative communication type, for example during which time of day and/or which day of the week, and to which alternative communication type users choose to be moved.

The communications server 102 may be further configured to engage in metric gathering and analysis in relation to the ability of each individual agent to engage in multiple communication sessions with different users simultaneously. For example, the server 102 may measure the average time that each agent spends on a voice call and how this time is affected by the agent being simultaneously engaged in a text based communications with another user. If the agent is trained to handle calls on a range of topics (for example sales, technical support, upgrades, etc.), then the average call time may be recorded separately for each topic. Other ways of assessing an agent's ability to multi-task may be measured, for example whether the case ID is closed or not at the end of the communication (either voice or text based) and how satisfied the caller was with the agent's performance. The agents may be ranked according to their ability to multi-task and this ranking used as a priority indicator when assigning incoming communications. When a user opts to change to an alternative communication type, they may be assigned to the free agent for that communication type who has the highest ranking.

In some embodiments, when the system 100 receives an indication from a user that the user wishes to be transferred to an alternative communication type, the system establishes the new connection while maintaining the user's current connection. This may comprise maintaining the user's current position in the queue for the communication type via which the user initially contacted the communications system 100. For example, if the user initially contacted the system via a voice call and is being held in a voice call queue, but then elects to be transferred to SMS communication, the system may begin communication with the user via SMS (for example by sending a welcome message), while maintaining the user's position in the voice call queue. The user terminal may hang-up the voice call in order to allow the user to engage in SMS communication, or may continue the voice call simultaneously. If the user hangs-up the voice call, then their position in the queue may still be maintained by the system 100 using the case ID assigned to the call. If the user's query is subsequently dealt with via the SMS communication, then the agent can mark the case ID as closed and the user will be removed from the voice call queue. If the user's query cannot be dealt with via SMS communication, or if the user reaches the top of the voice call queue, then the user may elect to switch back to voice call communication, or may be switched back automatically. The above described embodiment allows the system 100 to seamlessly switch a user between multiple communication types under the same case ID to better use the available system resources.

In some other embodiments, the system 100 is configured to initiate, via the alternative communication type, the communication with a user when it is determined that the queue in which the user is held has exceeded the threshold size. System initiated communication may be done only for 'known' users, i.e. users whose identity is stored in a database accessible by the system 100 and who have been identified. Furthermore, this may only be done for particular known users, such as those considered very important clients. As an example, if the user is held in voice call queue which exceeds the threshold size, then the system 100 searches a database to see if the user is known. If the user is known and meets the other relevant criteria, then the system initiates communication with the user via SMS (e.g. by sending a welcome message) and assigns the case to a free SMS agent. The system may use the same phone number as the user has used to contact the system 100, or it may use an alternative number associated with the user. In this manner, users who are already known to the system and/or who are considered of high priority are serviced more quickly and are therefore on hold for a shorter period of time, saving communication resources within the system 100.

As described above, the system 100 may be configured to maintain the user's position in the queue for the initial communication type while initiating and conducting communication over the alternative communication type.

Figure 4:
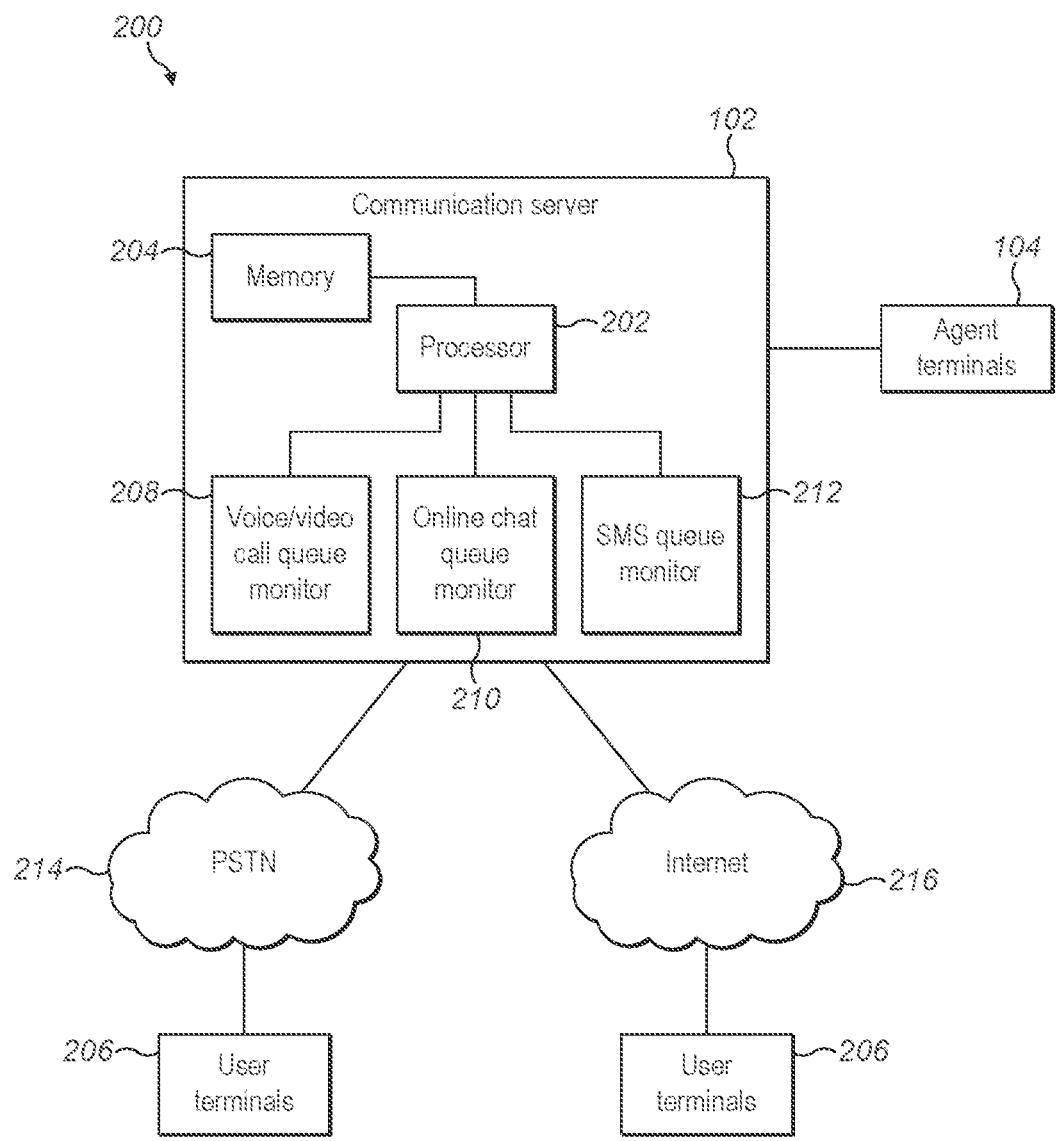
FIG. 4 is a schematic diagram of a communication system 200, showing further details of a communications server.

FIG. 4 is a schematic illustration of a communication system 200, showing further details of the communications server 102 and the interconnections between the server and terminals.

The communications server 102 may be a Private Branch Exchange (PBX) of any suitable type. The communications server 102 may be a VOIP enabled server and may communicate using the SIP protocol. The communications server 102 comprises a processor 202 and a memory 204. The memory 204 stores queue load monitoring and balancing software which is called and executed by the processor 202. The communications server 102 is configured to communicate with user terminals 206 via a PSTN 214 and/or via the internet 216. The communications server 102 may communicate directly with the agent terminals 104 or may also communicate with the agent terminals 104 via the PSTN 214 and/or internet 216.

The communications server 102 also comprises a voice/video call queue monitor 208, an online chat queue monitor 210 and an SMS queue monitor 212. These queue monitors (208, 210, 212) may be separate modules installed in the communications server 102 and accessible by the processor 202. Alternatively, the queue monitors (208, 210, 212) may be software modules or application stored in the memory 204. Each queue monitor (208, 210, 212) is configured to monitor a respective queue, or a plurality of queues. The communications server 102 may also comprise separate web conferencing and email queue monitors (not shown).

The communications server 102 may be configured to use the information received from the queue monitors (208, 210, 212) to determine an expected queue time for each user being held in the respective queue. This expected queue time may be communicated to the user along with the notification giving the option to switch to an alternative communication type. This allows the user to make an informed decision about whether to switch to the alternative communication type or to continue waiting in their current queue. The communications server 102 may be configured to offer a user multiple alternative communication options. For example, if the user is on hold in a voice call queue and the communications server 102 determines that both the online chat queue and the SMS queue are empty (i.e. no users in those queues), then the notification may give options to transfer to either of the free communication types.

In some situations, for example if a communication medium is very overloaded, the communications server 102 may offer the option to transfer to an alternative communication type, even if there is also a queue for that alternative communication type. For example, the number of users on hold in the voice call queue may be very large, such that the expected wait time for a user joining the queue is e.g. 15 minutes or more. All of the available agents for online chat and SMS communication may also be busy, such that there are queues for these communication types, but the expected wait time may be only a few minutes, due to there being a much lower number of users in these queues. In this scenario, the users joining the voice call queue and/or the users already in the voice call queue may be informed by the notification from the communications server 102 that the queue times for other communications types is much less, and be given the option to switch to an alternative communication type.

The decision making process may be configurable based on data gathered about the users on hold in the queues in general e.g. whether they are calling on a landline, mobile, or using a computer to communicated via the internet. Alternatively, or in addition, the decision making may take into account user specific information stored in association with the user's identity in the memory 204 of the server 102, or in a separate database (not shown) elsewhere in the system 100. For example, it may be known that a particular user cannot conduct any voice calls or use SMS due to their work environment, and therefore must use email or web chat only. This restriction can be set as one or more flags in the memory/database that the decision making service uses to generate offers.

Each communication type may have multiple queues. Each queue monitor may monitor the number of users in the multiple queues separately, but also be able to average the queue lengths across all of the queues of the same type, so as to give a general impression of the queues for that communication type.

The system 100 may also be configurable to set the number of communication switch offers which are sent at any one time. For example, some operators may want to send offers in small batches of 5-10, and larger operators may want to send to hundreds or even the entire queue in one go. The number of offers sent at one time may depend on the number of free agents. For example, the maximum number of offers may be set at 80% of the number of free agents, with a minimum threshold of 5 offers.

Figure 5:
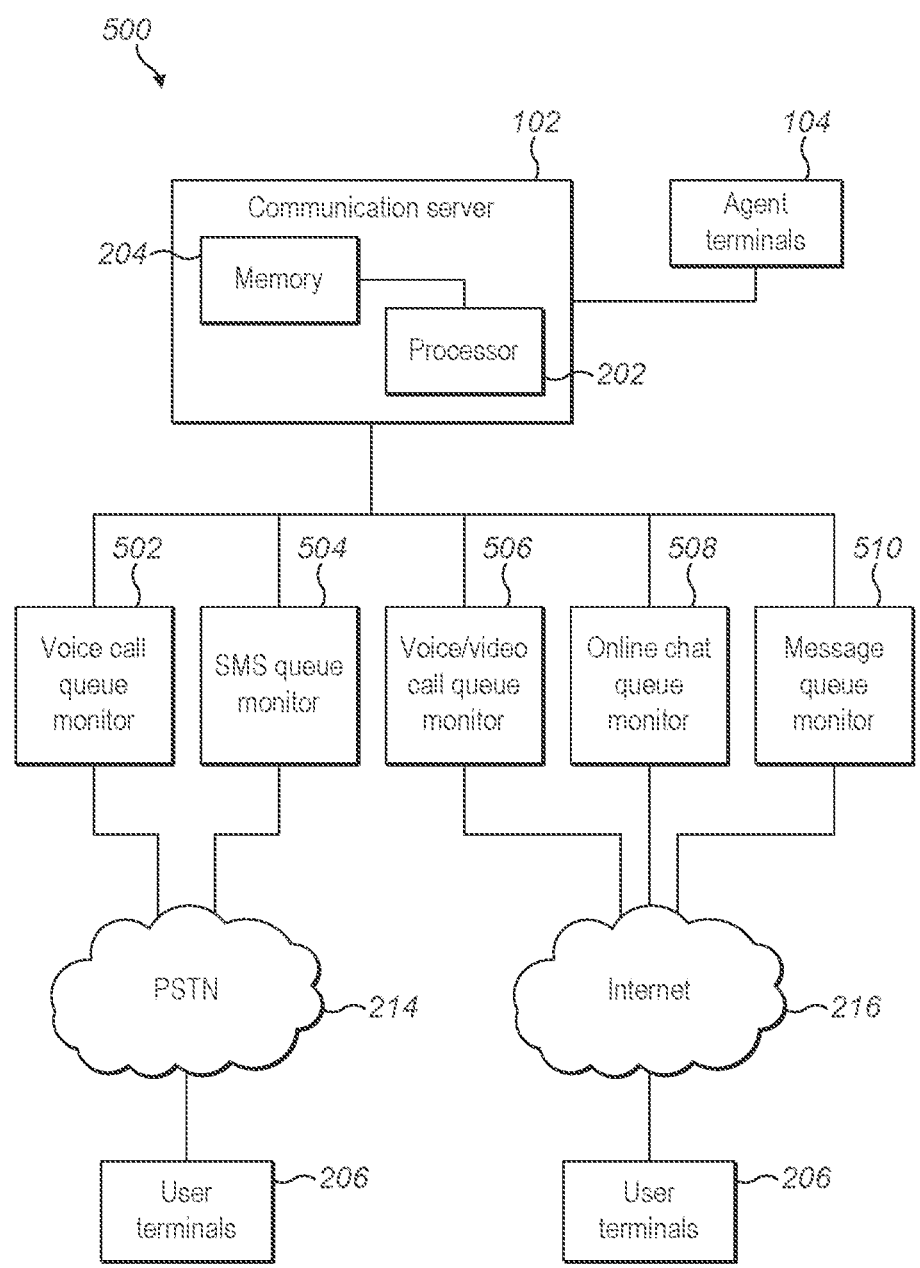
FIG. 5 is a schematic diagram of an alternative communication system 500 with distributed servers.

FIG. 5 is a schematic illustration of an alternative communication system 500. The system 500 is similar to the system 200 shown in FIG. 4, and like reference numerals are used for like components. The system 500 of FIG. 5 differs in that the queue monitors are separated from the central communications server 102. Each queue monitor may be embodied as a separate queue server. The queue monitors/servers may therefore be distributed, and there is no requirement for the queue server/monitors to be co-located with the communications server 102, or with each other. The system 500 comprises a voice call queue monitor 502, an SMS queue monitor 204, a voice/video call queue monitor 206, an online chat queue monitor 208 and a message queue monitor 510.

The voice call queue monitor 502 and SMS queue monitor 204 are arranged to communicate with user terminals 206 via the PSTN 214. The connection between the voice call queue monitor 502, SMS queue monitor 204 and communications server 102 may be via the PSTN, or via any other suitable medium, such as the Internet or a LAN. The voice/video call queue monitor 206, online chat queue monitor 208 and message queue monitor 510 are arranged to communicate with user terminals 206 via the internet 216. The message queue monitor 510 may have responsibility for monitoring all text based communication over the internet between user terminals 206 and the communications server 102, other than those conducted via the online chat function of the operator's website. For example, the message queue monitor 510 may monitor email communications and/or communications via a number of different applications running of the user terminals 206.

Persons skilled in the art will appreciate that the voice call queue monitor 502 and voice/video call queue monitor 506, may be implemented in a single server, or may be a combined queue monitor. The combined queue monitor is capable of communicating via both the PSTN 216 and the internet 216. At high traffic levels, the voice queues may be split across multiple queue servers and the system 500 would comprise multiple instances of the queue monitors.

In some embodiments each queue monitor 502, 504, 506, 508, 510 may comprise a processor and memory (not shown) and may be configured to communicate with the other queue monitors, such that each queue monitor is aware of the queue size of every other communication type. The responsibility for determining when to offer users an alternative communication type and for sending out the offers may then be delegated from the server 102 to the queue monitors.

Figure 6:
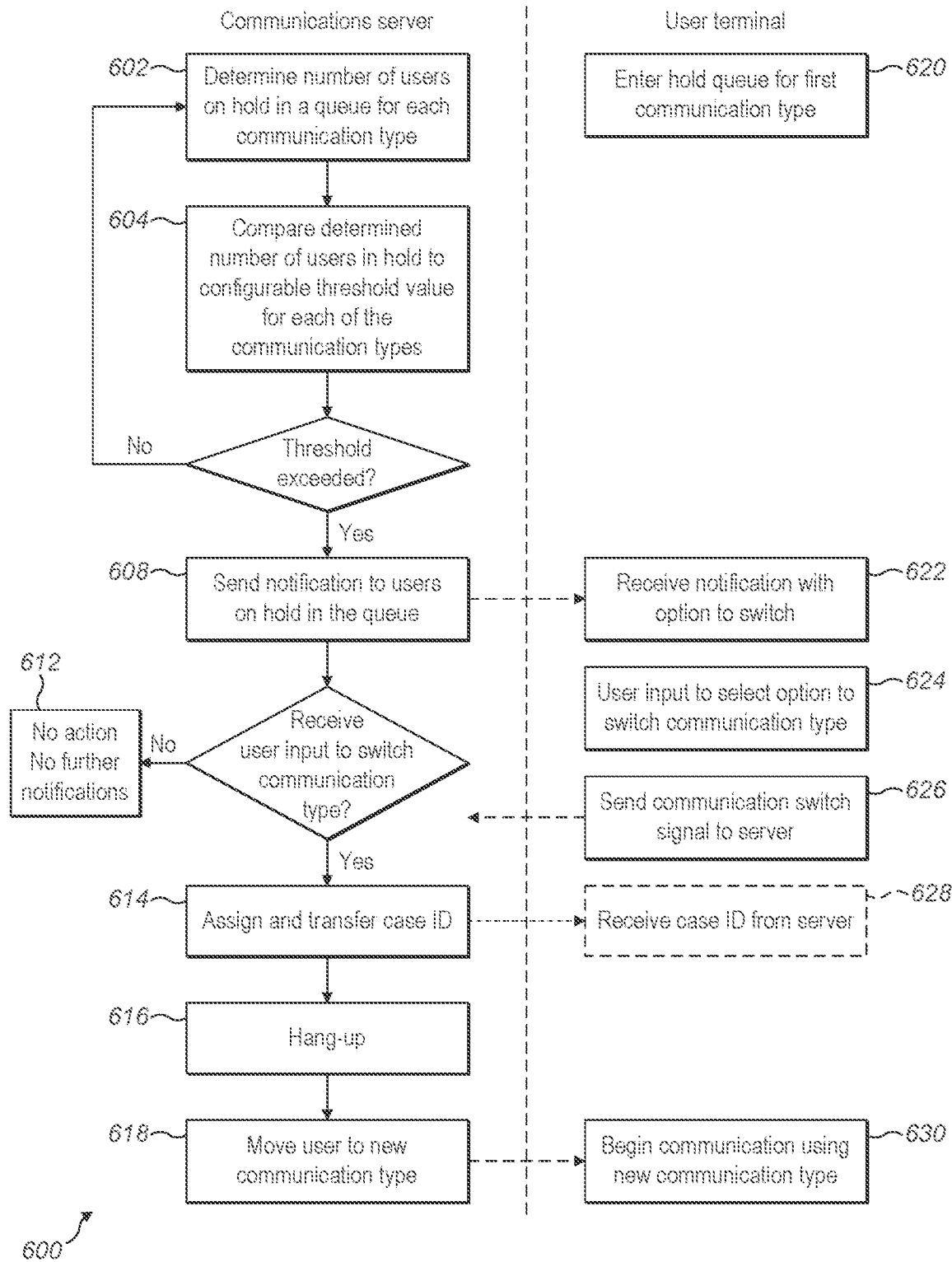
FIG. 6 is a flow chart illustrating an exemplary workflow.

FIG. 6 is a flow chart 600 illustrating an exemplary workflow for both a communications server and at the user terminals. Referring firstly to operations carried out by the communications server, at step 602, the communications server determines a number of users on hold in a queue for each of the communication types. At step 604, the communications server compares the determined number of users on hold in the queue for each of the communication types to a configurable threshold value for each of the communication types. The implementations of steps 602 and 604 have been described in detail above.

At step 606, the communications server determines whether the number of users on hold in a queue for each communication type exceeds a threshold value for each communication type. If the threshold is not exceeded, then the communications server continues to monitor the respective queue in step 602. If the threshold is exceeded, then at step 608 the server sends a notification to one or more of the users on hold in the queue, the notification comprising an option to switch to an alternative communication type. The contents of the notification d the conditions under which it is sent have been described in detail above.

At step 610, the communications server determines whether it has received a user input to switch communication type. If no input is received, then the communications server takes no further action, i.e. the user remains in the queue, and sends no further notifications to that user. If a user input is received to switch communication type, then the process proceeds to step 614, in which the communications server assigns a case ID and transfers this case ID to the new communication type. In some embodiments, the case ID is created when the user first establishes communication with the communications server, which is concurrently with step 602. In this case, the communications server retrieves the case ID and associates it with the new communication type.

The communications server then hangs-up at step 616. This hang-up is not considered an abandonment of the call, as the case ID remains open and has been transferred to the new communication type. Where the initial communication type was text based, step 616 may constitute setting a logical flag to indicate that the initial communication has been completed, but that the case is still active. At step 618 the communications server moves the user to the new communication type. This may be implemented by establishing a communication with the user over the new communication type, for example by sending an initial greeting SMS or email. Alternatively, the communications server may communicate the case ID to the user and wait to be contacted by the user quoting the case ID.

Referring now to the operations performed on the user terminal, at the beginning of the workflow in step 620, the user terminal is on hold in a queue for a first communication type. During this time, the communications server makes its assessment of whether to offer the user terminal an option to switch to a new communication type. At step 622, the user terminal receives a notification containing an option to switch to a new communication type. This notification may be received as a result of the communications server operation in step 608. At step 624, the user terminal receives a local input to accept the option to switch communication types. At step 626, the user terminal sends a signal to the communications server to switch communication types. This may for example be in the form of a DTMF signal. The communications server uses the signal send in step 626 in its 'yes' determination at step 610. If the user decides not to accept the option to switch communication types, and selects this option, the user terminal sends a different signal (not shown), which is interpreted as 'no' in step 610.

In optional step 628, the user terminal receives the case ID form the server. It may be necessary to send the case ID to the user terminal, where the user will subsequently initiate communication via the new communication type. However, if the communications server can initiate communication with the user terminal via the new communication type, then it is preferable to keep the case ID internal to the system, rather than sending it to the user. At step 630, the user terminal begins communication via the new communication type.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

The invention claimed is:

1. A communications system configured to facilitate communication via a plurality of communication types, the communications system comprising:
   at least one queue monitor configured to determine a number of users on hold in a queue for each of the communication types,
   wherein the communications system is configured:
      to compare the determined number of users on hold in the queue for each of the communication types to a configurable threshold value for each of the communication types; and
      when the number of users on hold in a queue for a first communication type exceeds a threshold value for the first communication type, to send a notification to all of the users on hold in the queue, the notification comprising an option to switch to an alternative communication type.

2. The communications system according to claim 1, wherein the communications system is further configured to:
   receive a signal from a user terminal, the signal representing a user input selecting the alternative communication type; and
   in response to receiving the signal, disconnect the user terminal from the first communication type and to connect the user terminal via the alternative communication type.

3. The communications system according to claim 1, wherein the communications system is further configured to:
   receive a signal from a user terminal, the signal representing a user input selecting the alternative communication type; and
   in response to receiving the signal, to connect the user terminal via the alternative communication type while maintaining the user's position in the queue for the first communication type.

4. The communications system according to claim 1, wherein a number of users on hold in a queue of a second communication type is below a threshold value for the second communication type.

5. The communications system according to claim 1, wherein the notification comprises a plurality of options to switch to one of a plurality of alternative communication types.

6. The communications system according to claim 1, wherein the notification further comprises an estimated hold time for the alternative communication type.

7. The communications system according to claim 1, wherein the threshold value corresponds to an average maximum holding time.

8. The communications system according to claim 1, wherein the plurality of communication types includes at least two of: voice call, online chat, video call, web conference, Short Message Service and email.

9. The communications system according to claim 1, wherein the communications system is configured to facilitate communication between a plurality of agents and a plurality of users.

10. The communications system according to claim 9, wherein the communications system is configured to simultaneously:
    facilitate communication between a first agent and a first user via the first communication type; and
    facilitate communication between the first agent and a second user via a second communication type.

11. The communications system according to claim 10, wherein the first communication type is a voice call and the second communication type is one of an online chat or SMS.

12. The communications system according to claim 1, wherein one or more of the communication types comprises multiple queues and wherein the queue monitor is configured to average the number of users on hold in the multiple queues.

13. The communications system according to claim 1, wherein the communications system is further configured to estimate a hold time remaining for each user on hold in the queue for the first communication type.

14. The communications system according to claim 13, wherein the communications system is further configured to send the notification to all of the users in the queue for the first communication type whose estimated hold time remaining exceeds the configurable threshold value.

15. The communications system according to claim 1, wherein the communication system is a communications server.

16. A method for operating a communications system configured to facilitate communication via a plurality of communication types, the method comprising:
a queue monitor determining a number of users on hold in a queue for each of the communication types;
the communications system comparing the determined number of users on hold in the queue for each of the communication types to a configurable threshold value for each of the communication types;
when the number of users on hold in a queue for a first communication type exceeds a threshold value for the first communication type, the communications system sending a notification all of the users on hold in the queue, the notification comprising an option to switch to an alternative communication type.

17. A non-transitory computer-readable storage medium having stored thereon computer-readable code, which, when executed by computing apparatus, causes the computing apparatus to perform the method of claim 16.

18. A communications system configured to facilitate communication via a plurality of communication types, the communications system comprising:
at least one queue monitor configured to determine a number of users on hold in a queue for each of the communication types,
wherein the communications system is configured:
to compare the determined number of users on hold in the queue for each of the communication types to a configurable threshold value for each of the communication types;
when the number of users on hold in a queue for a first communication type exceeds a configurable threshold value for the first communication type, to initiate a communication with a known user on hold in the queue via an alternative communication type and to send a notification to all of the users on hold in the queue, the notification comprising an option to switch to an alternative communication type; and
to maintain the known user's position in the queue for the first communication type while communicating via the alternative communication type.

* * * * *